United States Patent

Farkas et al.

[11] Patent Number: 5,580,366
[45] Date of Patent: Dec. 3, 1996

[54] AUTOMATED GLASSWARE MANUFACTURE CONTROLLER

[75] Inventors: Daniel S. Farkas, Maumee; D. Wayne Leidy, Perrysburg, both of Ohio

[73] Assignee: Owens-Brockway Glass Container Inc., Toledo, Ohio

[21] Appl. No.: 235,816

[22] Filed: Apr. 29, 1994

[51] Int. Cl.⁶ ............................................. C03B 9/41
[52] U.S. Cl. ................ 65/158; 364/473.01; 364/476.01; 65/29.11; 65/DIG. 13
[58] Field of Search ................. 65/29.1, 29.11, 65/158, 160, 163, 167, 207, DIG. 13; 364/473, 476

[56] References Cited

U.S. PATENT DOCUMENTS

| Re. 29,188 | 4/1977 | Croughwell | 65/163 |
|---|---|---|---|
| 4,100,937 | 7/1978 | Mallory | 137/596.16 |
| 4,141,711 | 2/1979 | Zabor | 65/29 |
| 4,145,204 | 3/1979 | Farkas et al. | 65/164 |
| 4,145,205 | 3/1979 | Farkas et al. | 65/164 |
| 4,152,134 | 5/1979 | Dowling et al. | 65/163 |
| 4,266,961 | 5/1981 | Wood | 65/29.1 |
| 4,338,115 | 7/1982 | Farkas | 65/29 |
| 4,338,116 | 7/1982 | Huff et al. | 65/29 |
| 4,339,260 | 7/1982 | Johnson et al. | 65/160 |
| 4,362,544 | 12/1982 | Mallory | 65/163 |
| 4,364,764 | 12/1982 | Farkas et al. | 65/29 |
| 4,369,052 | 1/1983 | Hotmer | 65/160 |
| 4,375,669 | 3/1983 | Johnson et al. | 364/473 |
| 4,394,148 | 7/1983 | Ryan | 65/159 |
| 4,400,192 | 8/1983 | Farkas | 65/29 |
| 4,402,721 | 9/1983 | Ericson et al. | 65/29.1 |
| 4,459,146 | 7/1984 | Farkas et al. | 65/29 |
| 4,478,629 | 10/1984 | Wood et al. | 65/163 |
| 4,599,099 | 7/1986 | Jones | 65/29.1 |
| 4,615,722 | 10/1986 | Steffan et al. | 65/158 |
| 4,685,947 | 8/1987 | Liska et al. | 65/29.1 |
| 4,705,552 | 11/1987 | Liska et al. | 65/158 |
| 4,762,544 | 8/1988 | Davey | 65/29 |
| 5,345,389 | 9/1994 | Calvin et al. | 364/473 |

*Primary Examiner*—Donald E. Czaja
*Assistant Examiner*—Sean Vincent

[57] ABSTRACT

A glass production system includes a glass forming machine having a multiplicity of operating mechanisms for converting gobs of molten glass into hollow glass containers, a plurality of solenoid valves responsive to valve drive signals for operating the multiplicity of operating mechanisms, and a plurality of valve driver circuits individually coupled to the solenoid valves and responsive to control signals to operate the valves and operating mechanisms in synchronism and in sequence for manufacture of the glass containers. An electronic controller has prestored control programming for generating valve control signals in synchronism and sequence, and a configurable or programmable logic array connected between the controller and the valve driver circuits for providing the controller-generated control signals to the valve driver circuits during normal operation. The configurable logic array is responsive to stop signals to provide second control signals to the valve drivers for controlled termination of operation at the glass forming mechanisms. The configurable logic array is responsive to the controller during a programming mode of operation for selectively configuring or reconfiguring the logic array to provide such second control signals in order to terminate operation at the operating mechanisms in the desired manner.

12 Claims, 4 Drawing Sheets

AUTOMATED GLASSWARE MANUFACTURE CONTROLLER

The present invention is directed to manufacture of glassware such as hollow glass containers, and more particularly to a method and system for automated control of an individual section machine.

BACKGROUND AND OBJECTS OF THE INVENTION

The art of glass container manufacture is currently dominated by the so-called individual section or IS machine. Such machines comprise a plurality of separate or individual manufacturing sections, each of which includes a multiplicity of operating mechanisms for converting gobs of molten glass into hollow glass containers. In general, each section includes a parison mold in which a glass gob is initially formed in a blowing or pressing operation, an invert arm for transferring the parison to a blow mold in which the container is blown to final form, and tongs for removing the container for transfer to an annealing lehr. Additional mechanisms provide for closure of mold halves, movement of baffles and blowing nozzles, control of mold cooling wind, etc. U.S. Pat. No. 4,362,544 includes a comprehensive background discussion of the art of both blow-and-blow and press-and-blow glassware forming processes, and also discloses an electropneumatic individual section machine adapted for use in either process.

Initially, the operating mechanisms of each machine section were operated by pneumatic valves carried by a valve block and responsive to cams mounted on a timing shaft coupled to the machine. Synchronism among the mechanisms within each section, and among the various sections of the machine, was therefore controlled by the timing shaft and the valve drive cams. U.S. Pat. No. 4,152,134 discloses an improved control arrangement in which a machine supervisory computer (MSC) is connected to a plurality of individual section computers (ISC) each associated with a corresponding section of the IS machine. Each individual section computer is connected through an associated section operator console (SOC) to solenoid valves in an electropneumatic valve block, which are responsive to electronic valve control signals from the section computer and operator console for controlling operation of the associated section operating mechanisms. A timing pulse generator is connected to the machine supervisory computer and to the individual section computers for synchronizing operation within and among the individual sections. The individual section computer and the section operator console illustrated in the noted patent were subsequently combined in a computerized section operator console (COM-SOC, a trademark of applicant's assignee).

Although the glassware manufacturing systems disclosed in the noted patents, as well as the several additional patents referenced hereinafter, have enjoyed substantial commercial acceptance and success, further improvements remain desirable. For example, although it has heretofore been proposed in U.S. Pat. No. 4,394,148 to provide a driver circuit for each solenoid valve that generates a signal in the event of a circuit fault condition, such fault conditions have not heretofore been readily associateable by an operator with specific operating mechanism in the IS machine. Nor has a driver or solenoid fault condition resulted in either an indication of corrective action to be taken by an operator, or automatically initiation of action at the IS machine independent of operator intervention.

U.S. Pat. Nos. 4,338,115 and 4,364,764 discuss, among other principles, controlled termination of IS machine operation in the event of either an emergency stop or a programmed stop situation. In general, an emergency stop situation is one that calls for termination of motion at all operating mechanisms as quickly as possible, while a programmed stop situation is one that calls for termination of motion in a programmed manner that may facilitate subsequent restart of the machine. In prior art control systems, diodes and/or jumper wires are installed to interface the emergency stop and programmed stop switch or relay contacts to the solenoid valve drivers for initiating the stop sequences in the desired manner for a particular machine. These hardware arrangements thus operated to dedicate the controller to a specific IS machine or machine configuration, reducing desirable manufacturing flexibility.

U.S. Pat. Nos. 4,339,260 and 4,362,544 disclose disposition of the COM-SOC unit on a wireway of the IS machine frame, and connection of the unit to the separate solenoid valves in associated valve blocks by multiple-conductor cables. In a machine section having a valve block or blocks with ninety-six solenoid valves (including spares), for example, there would be ninety-six conductors running through the frame wireway for each machine section, or nine hundred sixty conductors for a ten-section machine. These cables increase the cost of the installation.

It is therefore a general object of the present invention to provide a system and method for control of glass production that alleviate some or all of the problems and difficulties hereinabove set forth. Another and more specific object of the present invention is to provide a system and method of the described character in which fault conditions at one or more of the solenoid valves and/or valve drivers provides an automatic indication of the associated mechanism in the IS machine, and initiates corrective or evasive action as is appropriate for that particular machine mechanism. Another object of the present invention is to provide a system and method of the described character in which responsiveness of the controller and valve drivers to externally generated stop situations—i.e., emergency stop and programmed stop situations—is selectively and electronically programmable through the control computer, thereby making the controller readily adaptable for use in conjunction with a variety of IS machines and machine configurations. Another object of the present invention is to provide a system and method of the described character in which the valve drivers are positioned separately from the COM-SOC controller and connected thereto by a bi-directional serial communication line, reducing the cost of such interconnection, increasing flexibility of the control system, and increasing availability of cooling air flow through the machine frame plenum on which the COM-SOC is mounted. Another and related object of the present invention is to provide a system and method in which activation of the valve drivers is synchronized to the machine timing signal, so that all valves are activated/deactivated substantially simultaneously at each system operating step.

SUMMARY OF THE INVENTION

A glass production system includes a glass forming machine having a multiplicity of operating mechanisms for converting gobs of molten glass into hollow glass containers, a plurality of solenoid valves responsive to valve drive signals for operating the multiplicity of operating mechanisms, and a plurality of valve driver circuits individually coupled to the solenoid valves and responsive to control signals to operate the valves and operating mechanisms in synchronism and in sequence for manufacture of the glassware. In accordance with a first aspect of the invention, an electronic controller has prestored control programming for generating valve control signals in the synchronism and sequence desired for normal operation, and a configurable or programmable logic array connected between the controller and the valve driver circuits for providing the controller-generated control signals to the valve driver circuits during normal operation. The configurable logic array is responsive to stop signals to provide second control signals to the valve drivers for controlled termination of operation at the glass forming mechanisms. The configurable logic array is responsive to the controller during a programming mode of operation for selectively configuring or reconfiguring the logic array to provide such second control signals to terminate operation at the operating mechanisms in a desired manner or sequence. In this way, the stop sequence(s) of the control electronics is readily programmable and reprogrammable for use in conjunction with glassware manufacturing machines of differing design and/or configuration.

In accordance with a second aspect of the present invention, which may be employed separately from or more preferably in combination with other aspects of the invention, each valve driver circuit includes facility for generating a fault signal in the event of malfunction at the driver circuit, at the associated solenoid valve or at the interconnection cable. The control electronics monitors such valve driver fault signals, and has prestored therein information associating each of the valve driver circuits and its associated solenoid valve with a particular operating mechanism in the machine. In response to a fault signal, such information is retrieved for associating the valve driver circuit at which the fault signal occurred with a fault condition at the associated operating mechanism. The control electronics also has prestored information associating a fault condition at each of the valve driver circuits with an associated evasive or remedial action, which may comprise for example initiation of an emergency or programmed stop sequence, indication of a fault condition to an operator, or the taking of no action at all.

In accordance with yet another aspect of the present invention, which again may be implemented separately from or in combination with other aspects of the invention, the control electronics for each machine section is divided between a computerized section operator console (COM-SOC) mounted on a cooling plenum in the machine frame, and an intelligent control output module (ICOM) mounted on the frame or on the associated valve block separate from the operator console and connected to the operator console by a bidirectional serial communication link. The COM-SOCs and ICOMS of the several machine sections are all connected to a timing signal generator, which generates timing pulses in synchronism with operation of the entire glassware manufacturing machine. Between such timing pulses, each COM-SOC communicates with its associated ICOM to download valve control information associated with the machine operating sequence, and upload data indicative of fault or other sensor conditions. Each ICOM then sets appropriate valve control signals and, upon occurrence of the next timing pulse, the valve control signals are simultaneously loaded into associated latches so that all of the valve control signals are effectively generated simultaneously at each timing cycle. Such division of and serial communication between the control electronics reduces installation cost and complexity, while maintaining desired synchronization by synchronizing the valve drive signals on the machine timing pulse.

BRIEF DESCRIPTION OF THE DRAWINGS

The invention, together with additional objects, features and advantages thereof, will be best understood from the following description, the appended claims and the accompanying drawings in which:

DETAILED DESCRIPTION OF PREFERRED EMBODIMENT

Figure 1:
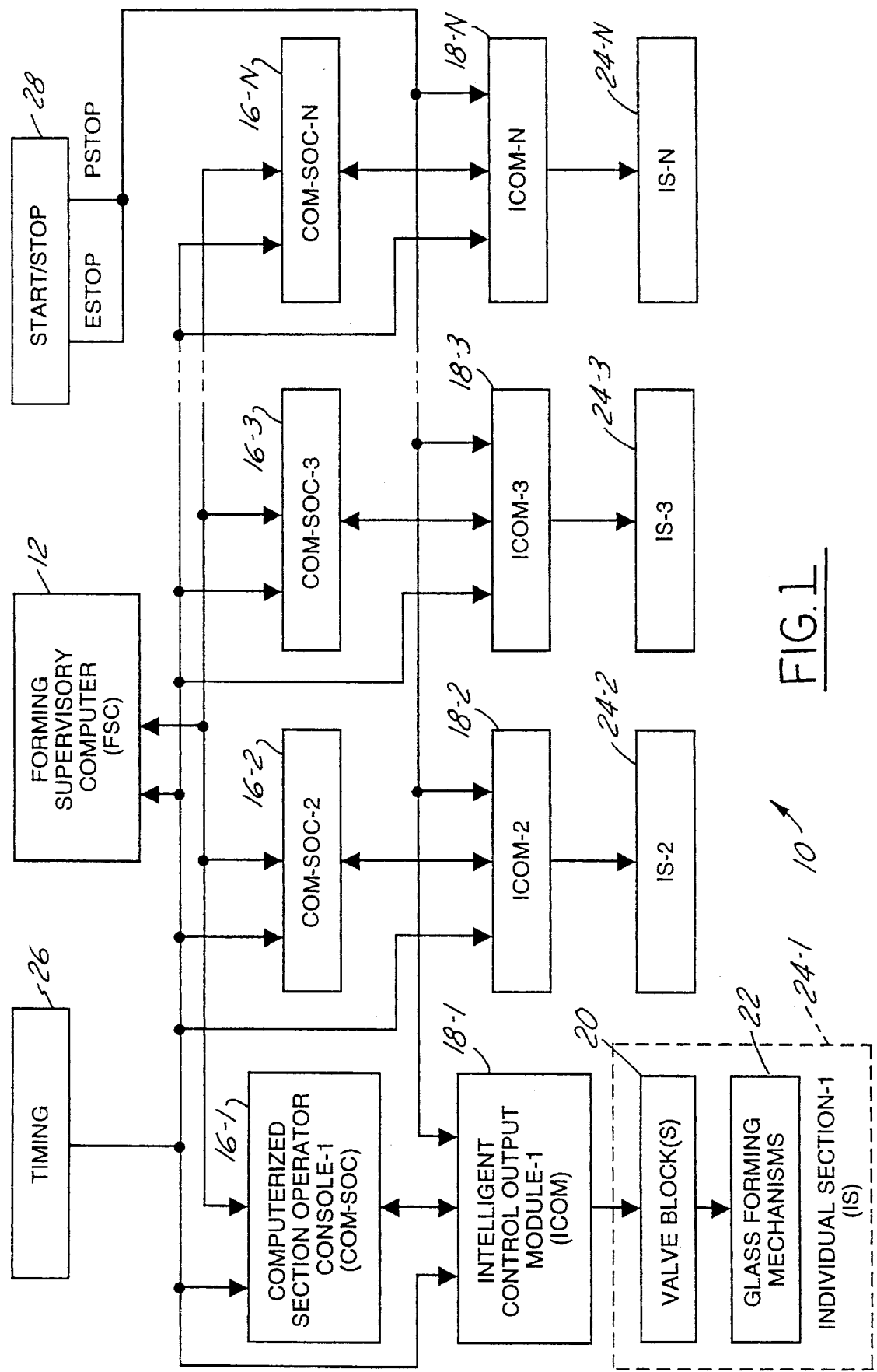
FIG. 1 is a functional block diagram of a glassware production system in accordance with a presently preferred embodiment of the invention.

FIG. 1 illustrates a glassware production system 10 in accordance with a presently preferred embodiment of the invention as comprising a forming supervisory computer (FSC) 12 connected by an ethernet bus 14 with a plurality of computerized section operator consoles (COM-SOCs) 16-1 to 16-N. (The trademark COM-SOC II is employed by applicant's assignee to refer to COM-SOCs 16-1 to 16-N, to distinguish the same from the earlier COM-SOC units.) Each COM-SOC 16-1 through 16-N is connected to an associated intelligent control output module (ICOM) 18-1 to 18-N for providing programming and control information to the ICOM, and receiving operating data therefrom. Each ICOM 18-1 to 18-N provides drive signals to the solenoid valves of one or more associated valve blocks 20, which in turn function to control operation of the glass forming mechanisms 22 of an associated individual machine section 24-1 to 24-N. FSC 12, COM-SOCs 16-1 to 16-N and ICOMs 18-1 to 18-N receive timing signals from a timing pulse generator 26. A start/stop circuit 28 also provides signals to each ICOM 18-1 through 18-N indicative of an emergency stop situation (ESTOP) and a programmed stop situation (PSTOP). Start/stop 28 may comprise remote operator console units associated with each individual section, an operator start/stop circuit for the entire machine, or most preferably both. Valve block 20 is illustrated, for example, in U.S. Pat. No. 4,100,937. Circuits suitable for use in timing pulse generator 26 are disclosed in U.S. Pat. Nos. 4,145,204, 4,145,205 and 4,400,192.

Figure 2:
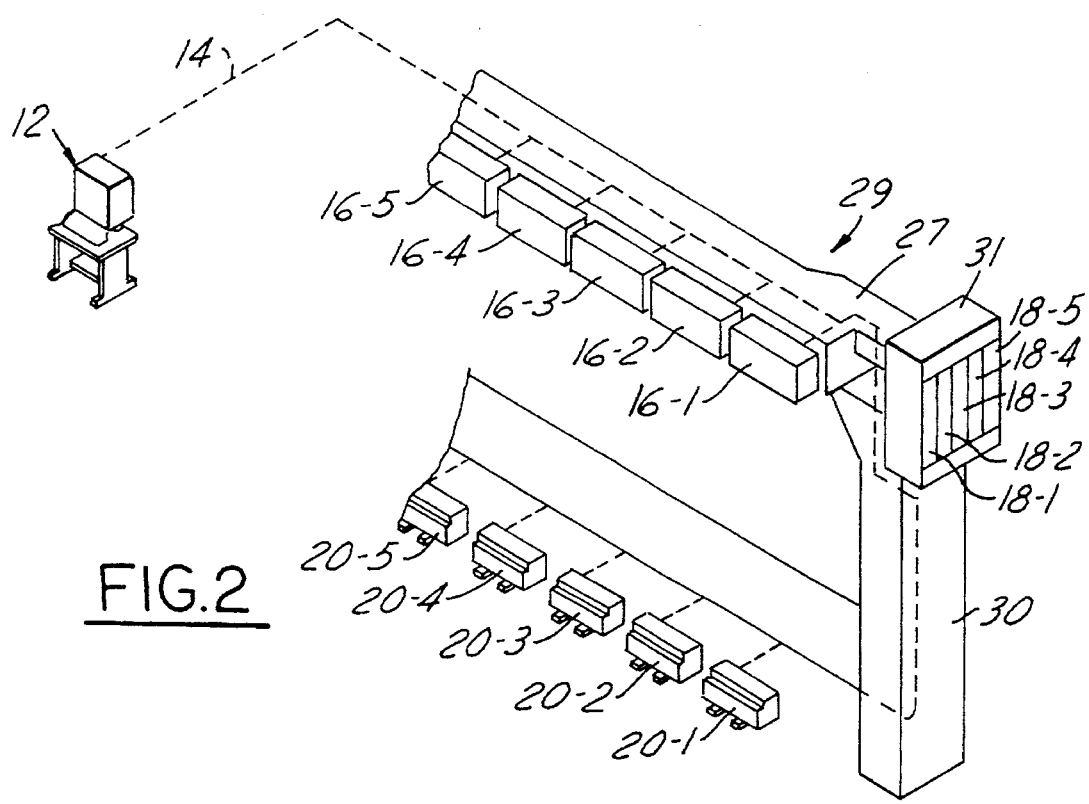
FIG. 2 is a fragmentary perspective view of an individual section (IS) machine frame that embodies the control system of the present invention.
Figure 3:
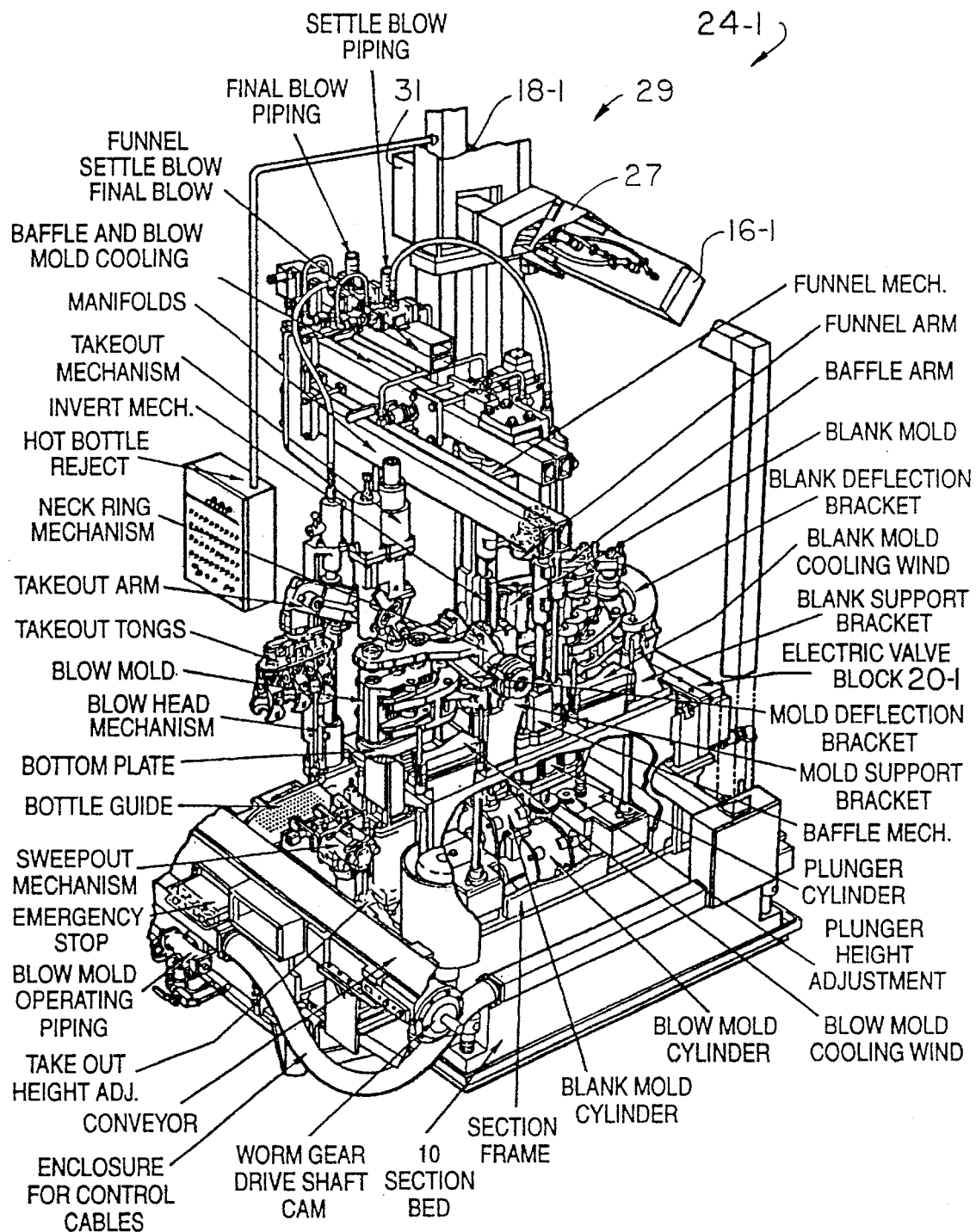
FIG. 3 is a perspective view that illustrates the major operating mechanisms of a single section of a triple-gob IS glass container forming machine.

FIG. 2 is a schematic diagram of the frame 29 of one-half of a ten-section IS machine, and FIG. 3 illustrates one section 24-1 of such machine. COM-SOCs 16-1 to 16-N are mounted on a cooling air plenum 27, through which air is driven to cool the COM-SOC electronics as disclosed in above-noted U.S. Pat. No. 4,339,260. Each COM-SOC 16-1 through 16-5 is connected by a cable to an associated ICOM 18-1 to 18-5 mounted in the junction box 31 on the side 30 of IS machine frame 29. Each ICOM 18-1 through 18-5 is connected by a multiple-conductor cable to the associated valve block 20-1 through 20-5, which is mounted at the bottom of the machine frame beneath the associated individual section. There can be multiple valve blocks in each machine section, all of which are driven by one ICOM for that section. FIG. 3 illustrates the major operating mechanisms of a single section 24-1 of an IS machine, which is described in greater detail in U.S. Pat. No. 4,362,544. Such machine includes electropneumatic valve block assembly 20 and is constructed to perform both blow-and-blow and press-and-blow manufacturing processes in differing modes of operation.

Figure 4:
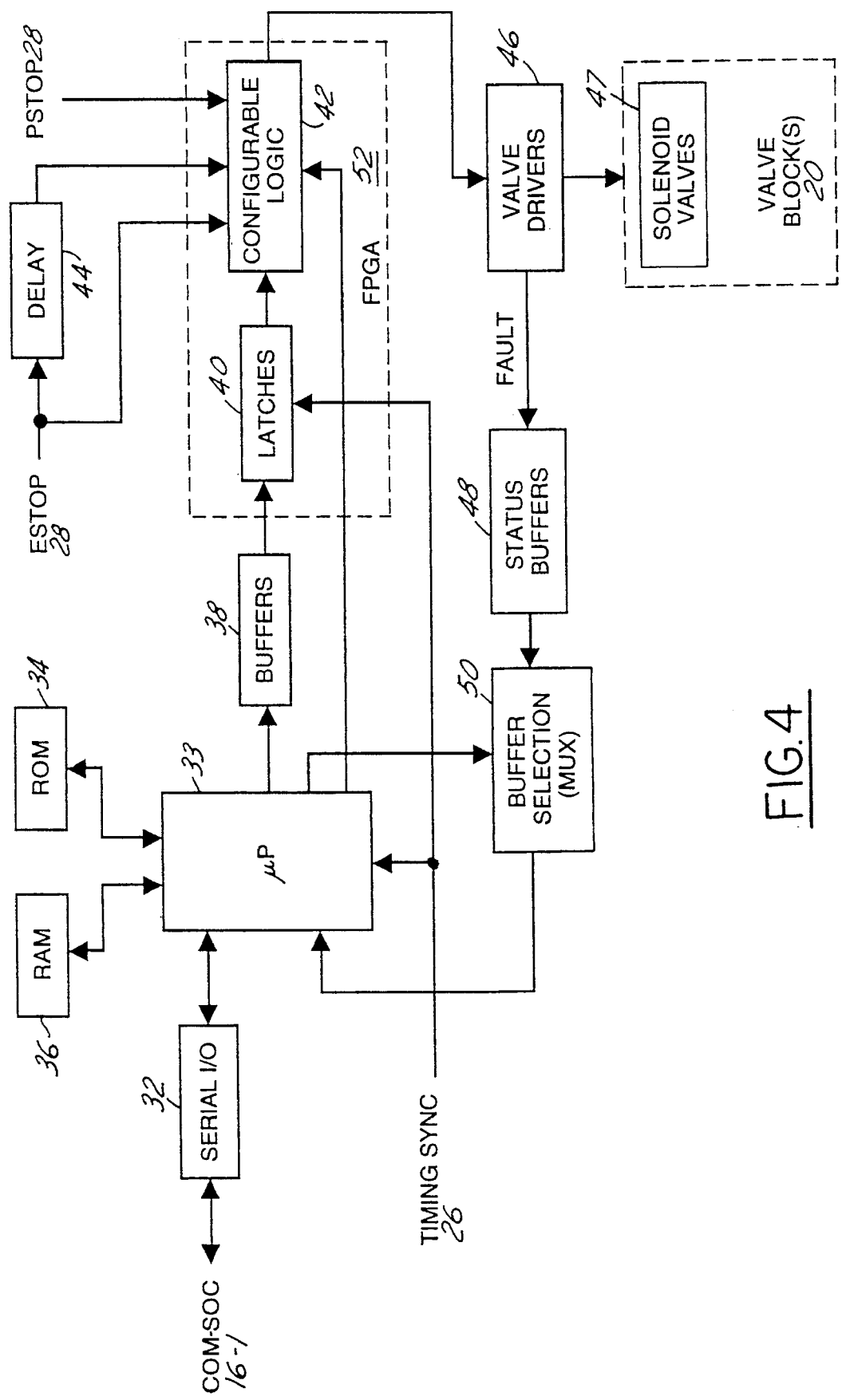
FIG. 4 is a more detailed functional block diagram of the intelligent control output modules (ICOMS) illustrated in FIGS. 1–3.

FIG. 4 is a functional block diagram of ICOM 18-1, ICOMs 18-2 through 18-N being identical thereto. A microprocessor 33 receives input data and control information from COM-SOC 16-1 (FIGS. 1-3), and provides return information indicative of machine status and operation, through a bi-directional serial I/O port 32. Microprocessor 33 is also connected to a read-only memory (ROM) 34 and a random access scratch-pad memory (RAM) 36. A plurality of buffers 38 receive control signals from microprocessor 33 indicative of the valve drive signals to be set or reset on the next machine timing cycle. The outputs of buffers 38 are individually connected to the data inputs of a plurality of parallel latches 40, which receive a synchronizing clock input from timing pulse generator 26 (FIG. 1). The outputs of parallel latches 40 are individually connected to a configurable logic array 42, which receives a programming control input from microprocessor 33 and stop control inputs PSTOP and ESTOP from remote start/stop logic 28 (FIG. 1). Emergency stop signal ESTOP is also fed through a delay 44 to provide a corresponding ESTOP-delayed signal to configurable logic array 42.

The parallel outputs of configurable logic array 42 are individually connected to associated valve drivers 46, which in turn are connected to associated solenoid valves 47 in valve block 20. Each valve driver 46 provides a fault signal to an associated segment of parallel status buffers 48 indicative of generation of an alarm or fault condition at the associated valve driver. The outputs of status buffers 48 are connected to a buffer selection multiplexer 50, which is controlled by microprocessor 33 to feed valve driver fault information back to the microprocessor. Valve drivers 46 may comprise circuits of the type shown in above-noted U.S. Pat. No. 4,394,148, which generate an alarm or fault signal in the event of a short circuit condition at the valve driver. Alternatively, and preferably, valve drivers 96 comprise a plurality of model PBD3548/IN integrated valve driver circuits marketed by Ericsson of Richardson, Tex. These commercially available valve drivers generate a fault or error signal in the event of excessive current draw indicative of a short circuit at the output or the associated valve solenoid, no current flow indicative of an open circuit at the associated valve solenoid, an output that will not turn off indicative of a short circuit to the supply voltage bus, or an over-temperature condition at the driver circuit. Any of these fault conditions results in generation of a fault signal on the corresponding fault line, and storage of such fault signal information in the associated status buffer 48. Where there are ninety-six solenoid valves in valve block 20 as in the example discussed above, there would also be ninety-six elements in buffers 38, latches 40, logic 42, drivers 46 and buffers 48, and ninety-six separate lines connecting all of the above.

Configurable logic array 42 and latches 44 together comprise a field programmable gate array or FPGA 52 of any suitable conventional type having an array of hardware gates selectively configurable to process signal information in a predetermined manner in real time. Such FPGAs are marketed, for example, by XILINX of San Jose, Calif., Part No. XC3030-50PC85I, and by Altera Corporation also of San Jose, Calif. During normal operation, logic array 42 is configured essentially to pass through valve control signals loaded into latches 40 from microprocessor 33 and buffers 38 upon occurrence of a timing sync pulse. These valve control signals turn the solenoid valves on or off upon occurrence of each timing sync pulse to operate the machine mechanisms in the normal manner. Thus, during normal operation, configurable logic 42 is essentially transparent. However, if an emergency stop signal ESTOP or a programmed stop signal PSTOP is received from remote start/stop generator 28 (FIG. 1), the programmed configuration of logic 42 assumes control, and generates valve control signals to drivers 46 to terminate operation of the machine operating mechanisms in the desired manner. Each output $E_n$ (n=1 to 96) of configurable logic 42 is defined by the equation:

$$E_n = f(A_n, B, C, D),$$

where $A_n$ is the input command from the corresponding latch 40, B is the ESTOP signal, C is the delayed ESTOP signal, and D is the PSTOP signal. In programming configured logic 42, any Boolean relationship among inputs A, B, C, and D can be obtained.

In operation, upon initial application of electrical power to ICOM 18-1, microprocessor 33, on command from COM-SOC 16-1, programs configurable logic array 42 from programming information prestored in ROM 34. Such programming information is indicative of the valve drive signals to be generated to obtain a desired shut-down sequence upon receipt of either an ESTOP or PSTOP signal. In the event that such that either such stop sequence is to be modified, such as when ICOM 18-1 is to be used with an IS machine of different configuration, microprocessor 33 may selectively reprogram configurable logic array 42, again on command from COM-SOC 16-1, using information received from COM-SOC 16-1 and stored in RAM 36. An example of a programmed stop sequence is disclosed in above-noted U.S. Pat. No. 4,364,764. Thus, in accordance with this aspect of the invention as summarized above, configurable logic 42 and FPGA 52 replaces the hardware jumpers and diodes of the prior art for terminating machine operation in a desired manner upon occurrence of a stop situation. Configurable logic 42 is readily reprogrammable as desired, so that the control circuitry is no longer dedicated to a particular IS machine configuration but effectively generic to any configuration.

Also stored in COM-SOC 16-1 is information that associates each valve driver 46 with its associated solenoid valve in valve block 20 and glass forming mechanisms operatively coupled to such solenoids. Upon generation of a fault signal associated with a particular valve driver 46 and reading of such fault signal through buffers 48 and multiplexer 50, COM-SOC 16-1 via microprocessor 33 retrieves such information. COM-SOC 16-1 determines which operating mechanism in the machine section is associated with the valve driver at which the fault signal was generated. Depending upon which operating mechanism is involved, COM-SOC 16-1 then initiates appropriate action. (Microprocessor 33 can be programmed to perform these functions independent of COM-SOC 16-1, if desired.) Such action may comprise an emergency stop situation, for example, if a driver or solenoid associated with the neck ring transfer arm were to fail, a programmed stop situation in the event that a failure at the final blow station is indicated, a situation calling for a warning indication to an operator at the COM-SOC control panel if a cooling wind fault is indicated, or a situation calling for no action in the event that a fault is indicated at an unused (spare) driver or valve. In this way, evasive action appropriate for each type of fault indication is automatically initiated by COM-SOC 16-1 without operator intervention.

Figure 5:
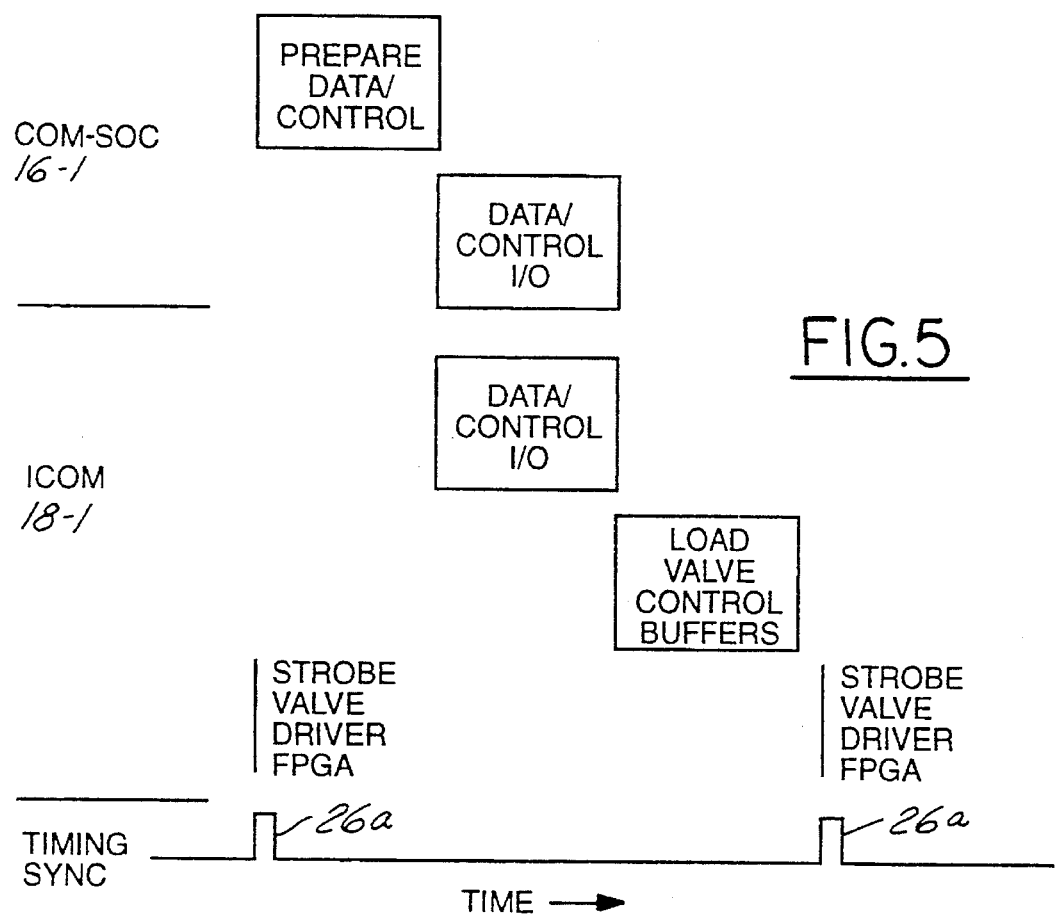
FIG. 5 is a diagram that graphically illustrates synchronous communication between control electronics and initiation of the valve drive signals in accordance with the preferred embodiment of the invention.

FIG. 5 illustrates timing of communication between COM-SOC 16-1 and ICOM 18-1, for example, and strobing of the valve driver signals at FPGA 52 and valve drivers 46 (FIG. 4). Upon occurrence of each timing sync pulse 26a from timing pulse generator 26 (FIG. 1), COM-SOC 16-1 prepares a package of data and control information to be transmitted to and requested from ICOM 18-1. Transmitted data and control information may comprise, for example, data indicative of the solenoid valves to be turned on and off upon occurrence of the next sync pulse 26a, reprogramming information for implementation in configurable logic 42 (FIG. 4), and a request for status update information from status buffers 48. Following preparation of such data/control package, bidirectional serial communication between COM-SOC 16-1 and ICOM 18-1 transmits data to ICOM 18-1, and transmits status information back to COM-SOC 16-1 as appropriate. Microprocessor 33 (FIG. 4) then loads valve control information into buffers 38 so that, upon occurrence of the next timing sync pulse 26a, the valve control signals are strobed into latches 40 (FIG. 4) and valve drivers 46 are turned on/off substantially simultaneously. In this way, enhanced control of the solenoid valves and associated operating mechanisms is maintained even though COM-SOC 16-1 is separate from ICOM 18-1 as previously described and communicates therewith over a serial communication link.

We claim:

1. A glass production system that includes a glass forming machine having a multiplicity of operating mechanisms for converting gobs of molten glass into glassware, a plurality of solenoid valves responsive to valve drive signals for operating said multiplicity of operating mechanisms, electronic control means for generating said valve drive signals to operate said mechanisms in a predetermined sequence to produce the glassware, and stop means for generating a stop signal to arrest operation of said mechanisms, said electronic control means comprising:

a plurality of valve driver circuit means individually coupled to said solenoid valves and responsive to control signals for supplying said valve drive signals to said valves, a controller including means having control programming prestored therein for generating first control signals in said predetermined sequence, and configurable logic means operatively connected between said controller and said valve driver circuit means for feeding said first control signals from said controller through to said valve driver circuit means in a normal mode of operation for producing glassware, and being responsive to said stop signal in a stop mode of operation to provide second control signals to said valve driver circuit means for controlled termination of operation of said glass forming mechanisms, said configurable logic means including means responsive to said controller in a programming mode of operation for selectively electronically configuring said configurable logic means to provide said second control signals to said valve driver circuit means in a predetermined manner responsive to said stop signal and independent of both said first control signals and said controller.

2. The system set forth in claim 1 wherein said controller includes means having prestored therein information for selectively configuring said configurable logic means to provide said second control signals, and means operable in said programming mode of operation to retrieve said prestored information and selectively configure said configurable logic means such that said configurable logic means is thereafter structured to generate said second control signals responsive to said stop signal in said stop mode of operation independent of said controller.

3. The system set forth in claim 2 wherein said configurable logic means is of volatile construction, and wherein said means operable in said programming mode of operation is responsive to application of power to said controller for initiating a said programming mode of operation and selectively configuring said configurable logic means responsive to said prestored information.

4. The system set forth in claim 2 wherein said controller further includes means for selectively varying said prestored information so as to vary selective configuration of said configurable logic means in said programming mode of operation.

5. The system set forth in claim 3 wherein said configurable logic means comprises a field programmable gate array having an array of hardware gates selectively configurable during said programming mode of operation to provide said second control signals to said valve driver circuit means in real time responsive to said stop signal and independent of said first signals from said controller.

6. The system set forth in claim 1 wherein said stop means includes means for generating an emergency stop signal B, a delayed emergency stop signal C and a programmed stop signal D, and wherein said configurable logic means provides n control signals $E_n$ to said valve driver circuit means according to the Boolean relationship $E_n = f(A_n, B, C, D)$, where $A_n$ is said first control signals, and where said relationship is separately prestored in said configurable logic means for each of said n signals $E_n$.

7. The system set forth in claim 1 wherein said stop means generates separate programmed stop and emergency stop signals, said configurable logic means being responsive separately to said programmed stop and emergency stop signals to arrest operation of said mechanisms in separate predetermined manners independent of said controller.

8. The system set forth in claim 1 wherein each of said plurality of valve driver circuit means includes means for generating a fault signal in the event of malfunction at said circuit means or the associated solenoid valve; and wherein said controller includes means having prestored therein information associating each said valve driver circuit means and the associated solenoid valve with a particular operating mechanism in said machine, and means responsive to a said fault signal for retrieving such information associated with the valve driver circuit means at which such fault signal occurred for indicating a fault condition associated with the associated mechanism.

9. The system set forth in claim 8 wherein said controller further includes means having prestored therein information associating a fault condition at each said valve driver circuit means with an associated action, and means responsive to a said fault signal for retrieving such information associated with the valve driver circuit means at which such fault signal occurred to initiate the action associated therewith.

10. The system set forth in claim 1 further comprising means for generating a timing signal synchronized with operation of said glass forming machine, and wherein said electronic control means includes means responsive to said timing signal for generating all of said valve driver signals substantially simultaneously to said valve driver circuit means.

11. The system set forth in claim 10 wherein said configurable logic means includes latch circuit means having data inputs for receiving said first control signals from said controller and a clock input responsive to said timing signal.

12. The system set forth in claim 1 wherein said machine has a frame with an air plenum; said electronic control means including an operator console mounted on said plenum such that air in said plenum cools said console, said console including a portion of said controller for generating said first control signals, and an output module mounted on said frame separate from said console and connected to said console by serial communication means for receiving said first control signals.

* * * * *